United States Patent
Theocharous et al.

(10) Patent No.: US 10,558,987 B2
(45) Date of Patent: Feb. 11, 2020

(54) SYSTEM IDENTIFICATION FRAMEWORK

(71) Applicant: Adobe Inc., San Jose, CA (US)

(72) Inventors: Georgios Theocharous, San Jose, CA (US); Assaf Joseph Hallak, Tel Aviv (IL)

(73) Assignee: Adobe Inc., San Jose, CA (US)

( * ) Notice: Subject to any disclaimer, the term of this patent is extended or adjusted under 35 U.S.C. 154(b) by 754 days.

(21) Appl. No.: 14/207,145

(22) Filed: Mar. 12, 2014

(65) Prior Publication Data

US 2015/0262205 A1 Sep. 17, 2015

(51) Int. Cl.
    G06Q 30/02 (2012.01)
    G06Q 10/06 (2012.01)

(52) U.S. Cl.
    CPC ....... G06Q 30/0202 (2013.01); G06Q 10/067 (2013.01)

(58) Field of Classification Search
    None
    See application file for complete search history.

(56) References Cited

U.S. PATENT DOCUMENTS

| | | | | |
|---|---|---|---|---|
| 5,255,184 A * | 10/1993 | Hornick | ............... | G06Q 10/02 705/6 |
| 5,615,109 A * | 3/1997 | Eder | ............... | G06Q 10/06 705/35 |
| 6,366,890 B1 * | 4/2002 | Usrey | ............... | G06Q 10/087 705/28 |
| 6,609,101 B1 * | 8/2003 | Landvater | ............... | G06Q 10/06 705/7.25 |
| 6,769,009 B1 * | 7/2004 | Reisman | ............... | G06F 8/65 705/27.1 |
| 6,834,266 B2 * | 12/2004 | Kumar | ............... | G06Q 10/087 705/1.1 |
| 7,333,941 B1 * | 2/2008 | Choi | ............... | G06Q 10/02 705/37 |

(Continued)

OTHER PUBLICATIONS

RLDM Extended Abstracts, rldm org, Princeton NJ, Oct. 25-Oct. 27 2013 http://rldm.org/wp-content/Uploads/2013/10/RLDM2013ExtendedAbstracts.pdf.*

(Continued)

*Primary Examiner* — Octavian Rotaru
(74) *Attorney, Agent, or Firm* — SBMC

(57) ABSTRACT

Optimizing customer lifetime value (LTV) techniques are described. In one or more implementations, a simulator is configured to derive a prediction model based on data indicative of user interaction online with marketing offers. The prediction model may be produced by automatically classifying variables according to feature types and matching each feature type to a response function that defines how the variable responds to input actions. The classification of variables and/or corresponding response functions per the prediction model may consider dependencies between variables and dependencies between successive states. An evaluator may then be invoked to apply the prediction model to test a proposed marketing strategy offline. Application of the prediction model is designed to predict user response to simulated offers/actions and enable evaluation of marketing strategies with respect to one or more long-term objectives.

20 Claims, 10 Drawing Sheets

(56) References Cited

U.S. PATENT DOCUMENTS

| | | | | |
|---|---|---|---|---|
| 7,558,865 B2* | 7/2009 | Lin | G06Q 10/04 | 705/7.25 |
| 7,587,330 B1* | 9/2009 | Shan | G06Q 10/04 | 705/7.31 |
| 7,593,863 B1* | 9/2009 | Sunshine | G06Q 30/02 | 705/15 |
| 7,949,561 B2* | 5/2011 | Briggs | G06Q 30/02 | 705/14.41 |
| 7,987,111 B1* | 7/2011 | Sharma | G06Q 30/02 | 705/7.29 |
| 8,103,663 B2* | 1/2012 | Nishida | G06Q 30/02 | 707/723 |
| 8,341,063 B1* | 12/2012 | Cernyar | G06Q 40/06 | 705/35 |
| 8,442,862 B2* | 5/2013 | Lieberman | G06Q 30/02 | 705/14.13 |
| 8,583,484 B1* | 11/2013 | Chalawsky | H04N 21/23424 | 705/14.43 |
| 8,788,339 B2* | 7/2014 | Hughes | G06Q 30/0255 | 705/14.46 |
| 8,818,838 B1* | 8/2014 | Sharma | G06Q 30/0201 | 705/7.29 |
| 2001/0014881 A1* | 8/2001 | Drummond | G06F 9/548 | 705/43 |
| 2001/0039510 A1* | 11/2001 | Galomb | G06Q 30/02 | 705/14.73 |
| 2002/0147630 A1* | 10/2002 | Rose | G06Q 10/0635 | 705/7.31 |
| 2002/0169657 A1* | 11/2002 | Singh | G06Q 10/0637 | 705/307 |
| 2003/0081757 A1* | 5/2003 | Mengshoel | H04M 3/5233 | 379/265.06 |
| 2004/0024632 A1* | 2/2004 | Perry | G06Q 30/02 | 705/14.42 |
| 2004/0088211 A1* | 5/2004 | Kakouros | G06Q 30/0202 | 705/7.31 |
| 2004/0093296 A1* | 5/2004 | Phelan | G06Q 30/02 | 705/36 R |
| 2005/0071223 A1* | 3/2005 | Jain | G06Q 30/02 | 705/14.13 |
| 2005/0229161 A1* | 10/2005 | Wang | G06F 8/38 | 717/125 |
| 2006/0080172 A1* | 4/2006 | Najarian | G06Q 20/06 | 705/14.14 |
| 2006/0235965 A1* | 10/2006 | Bennett | G06Q 30/02 | 709/224 |
| 2008/0133342 A1* | 6/2008 | Criou | G06Q 30/02 | 705/14.41 |
| 2008/0154658 A1* | 6/2008 | Fallon | G06Q 40/02 | 705/38 |
| 2008/0306804 A1* | 12/2008 | Opdycke | G06Q 10/0631 | 705/14.43 |
| 2009/0144117 A1* | 6/2009 | Cavander | G06Q 10/06313 | 705/7.23 |
| 2009/0182620 A1* | 7/2009 | Sunvold | G06Q 30/02 | 705/7.29 |
| 2009/0240552 A1* | 9/2009 | Yang | G06Q 10/06 | 705/7.12 |
| 2010/0004976 A1* | 1/2010 | Faure | G06Q 10/04 | 705/7.31 |
| 2010/0036809 A1* | 2/2010 | Gerster | G06Q 30/0201 | 705/7.29 |
| 2010/0076850 A1* | 3/2010 | Parekh | G06Q 30/02 | 705/14.66 |
| 2010/0145793 A1* | 6/2010 | Cavander | G06Q 10/04 | 705/14.42 |
| 2010/0153179 A1* | 6/2010 | Bateni | G06Q 30/02 | 705/7.31 |
| 2010/0179855 A1* | 7/2010 | Chen | G06Q 10/063 | 705/7.31 |
| 2010/0223546 A1* | 9/2010 | Liu | G06F 17/30864 | 715/243 |
| 2010/0313205 A1* | 12/2010 | Shao | H04L 41/142 | 718/105 |
| 2011/0010211 A1* | 1/2011 | Cavander | G06Q 30/02 | 705/7.31 |
| 2011/0054920 A1* | 3/2011 | Phillips | G06Q 30/02 | 705/1.1 |
| 2011/0066496 A1* | 3/2011 | Zhang | G06F 17/30867 | 705/14.53 |
| 2011/0191315 A1* | 8/2011 | Neumeyer | G06Q 30/0243 | 707/706 |
| 2011/0246285 A1* | 10/2011 | Ratnaparkhi | G06Q 30/00 | 705/14.42 |
| 2011/0313844 A1* | 12/2011 | Chandramouli | G06Q 30/0241 | 705/14.42 |
| 2012/0030011 A1* | 2/2012 | Rey | G06Q 30/0242 | 705/14.43 |
| 2012/0059708 A1* | 3/2012 | Galas | G06Q 30/0244 | 705/14.43 |
| 2012/0143672 A1* | 6/2012 | You | G06Q 30/0243 | 705/14.42 |
| 2012/0259792 A1* | 10/2012 | Duan | G06Q 10/06 | 705/348 |
| 2012/0310961 A1* | 12/2012 | Callison | G06F 17/30867 | 707/756 |
| 2012/0330714 A1* | 12/2012 | Malaviya | G06Q 30/02 | 705/7.29 |
| 2013/0054349 A1* | 2/2013 | Ogawa | G06Q 30/00 | 705/14.43 |
| 2013/0103490 A1* | 4/2013 | Abe | G06Q 10/06315 | 705/14.43 |
| 2013/0124299 A1* | 5/2013 | Montgomery | G06Q 30/0244 | 705/14.43 |
| 2013/0124302 A1* | 5/2013 | Briggs | G06Q 30/0245 | 705/14.44 |
| 2013/0246177 A1* | 9/2013 | Fischer | G06Q 30/0222 | 705/14.53 |
| 2014/0019453 A1* | 1/2014 | Mohan | G06F 17/30867 | 707/738 |
| 2014/0046754 A1* | 2/2014 | Lee | G06Q 30/0242 | 705/14.41 |
| 2014/0195339 A1* | 7/2014 | Paulsen | G06Q 30/0247 | 705/14.46 |
| 2014/0244345 A1* | 8/2014 | Sollis | G06Q 30/02 | 705/7.29 |
| 2015/0134443 A1* | 5/2015 | Hallak | G06Q 30/0242 | 705/14.41 |
| 2015/0186928 A1* | 7/2015 | Chittilappilly | G06Q 30/0244 | 705/14.43 |

OTHER PUBLICATIONS

Ervolina et al, Simulating Order Fulfillment with Product Substitutions in an Assemble-To-Order Supply Chain, Preceedings of the 2006 Winter Simulation Conference, 2006 http://www.informs-sim.org/wsc06papers/259.pdf.*

Georgios Theocharous, adobe research webpages, Publications links 2010 to 2015 http://www.adobe.com/technology/people/san-jose/georgios-theocharous.html.*

Autocorrelation—Wikipedia, the free encyclopedia, archives org, Nov. 5, 2012 https://web.archive.org/web/20121105114717/https://en.wikipedia.org/wiki/Autocorrelation.*

Beygelzimer, et al.,' "Cover Trees for Nearest Neighbor", In Proceedings of the 23rd International Conference on Machine Learning, 2006, 8 pages.

Ernst, et al.,' "Tree-Based Batch Mode Reinforcement Learning", Journal of Machine Learning Research Apr. 2005, 54 pages.

Jonker, et al.,' "Joint Optimization of Customer Segmentation and Marketing Policy to Maximize Long-Term Profitability", Expert Systems with Applications, 27(2):159, 2004, 29 pages.

Kveton, et al.,' "Kernel-Based Reinforcement Learning on Representative States", In AAAI, 2012., 2012, 7 pages.

"Some Methods for Classification and Analysis of Multivariate Observations", Proceedings of the fifth Berkeley Symposium on Mathematical Statistics and Probability, 1967, pp. 281-297.

(56) References Cited

OTHER PUBLICATIONS

Nguyen, et al.,' "Online Feature Selection for Model-based Reinforcement Learning", In 30th International Conference on Machine Learning, 2013., 2013, 9 pages.
Pednault, et al.,' "Sequential Cost-Sensitive Decision Making with Reinforcement Learning", In Proceedings of the eighth ACM SIGKDD international conference on Knowledge discovery and data mining, KDD '02, 2002, 10 pages.
Pfeifer, et al.,' "Modeling Customer Relationships as Markov Claims", Journal of interactive marketing, 2000, 2000, 34 pages.
"Eligibility Traces for Off-policy Policy Evaluation", Computer Science Department Faculty Publication Series, 2000, 9 pages.
Sutton, et al.,' "A Convergent O(n) Algorithm for Off-policy Temporal-difference Learning with Linear Function Approximation", In Advance in Neural Information Processing Systems, 21, vol. 21, 2008, 2008, 8 pages.

* cited by examiner

Algorithm 1 System Identification part 1

Input: $A$ actions, $D$ features, $T$ state, action, reward and next state tuples $SARS_t = \langle X_t, a_t, r_t, X_{t+1}\rangle$, where $X_t = \langle x_1, x_2, ..., x_D\rangle_t$.

Output: A predictor for each action and feature $X_{t+1}(d) = f_{a,t}(X_t(\cdot, a_t, r_t))$ and a reward predictor for each action $r_{t+1} = f_{a,r}(X_t, r_t, a_t)$, where $rr$ are some predicted random variables at time $t+1$.

for $a = 1$ to $A$ and $d = 1$ to $D$ do
    $y_t = SARS(X_t(d)|a_t = a)$    ▷ for all the actions and features
    $y_{t+1} = SARS(X_{t+1}(d)|a_t = a)$    ▷ collect the states of the $d_{th}$ feature at times $t$
        ▷ collect the states of the $d_{th}$ feature at times $t+1$
    $ret(1) = \text{CONSTANT}(y_{t+1})$    ▷ is it a constant?
    $ret(2) = \text{DIFFERENT}(y_{t+1}, y_t)$    ▷ does it equal previous?
    $ret(3) = \text{CONSTANT}(y_{t+1} - y_t)$    ▷ is it a constant increment?
    $ret(4) = \text{SAME}(y_{t+1}, X_t(\cdot)) \ni X_{t+1})$    ▷ is it same as any of the other features?
    $ret(5) = \text{MULTIPLY}(y_{t+1} - y_t, X_t(\cdot))$    ▷ is difference a multiple of a feature at the previous time step?
    $ret(6) = \text{MULTIPLY}(y_{t+1} - y_t, [X_{t+1}(\cdot), r_{t+1}] \ni X_{t+1})$    ▷ is difference a multiple of a feature or the reward at the current time step?
    $ret(7) = \text{BINCOUNT}(y_{t+1}, y_t, [X_{t+1}(\cdot), r_t])$    ▷ is it counter of binary events?

[error, predictor] = FINDMINERRORPREDICTOR(ret)    ▷ find predictor with minimum error given the above checks

Fig. 4A

Algorithm 3 System Identification part 3 for $a = 1$ to $A$ and $d = 1$ to $D$ do
    ▷ If a feature has not been explained and has not been identified as a random variable
    if $explained(a,d) = false$ and $randomVariable(a,d) = false$ then
        $y_t = SARS(X_t(d)|a_t = a)$
        $y_{t+1} = SARS(X_{t+1}(d)|a_t = a)$
        $catFlag = \text{CATEGORICAL}(y_{t+1})$   ▷ check if categorical
        $(featrs) = randomVariable(a, \cdot) = true$   ▷ find all random variable features
        $tree = \text{CLASSIFYTREE}(\{X_t, X_{t+1}(featrs)\}, y_{t+1}, catFlag)$   ▷ train a tree
        $f_{a,d}(X_t, X_{t+1}(featrs), tree) = tree(\{X_t, X_{t+1}(featrs)\})$
        $explained(a,d) = true$   ▷ Everything else
    end if
end for for $a = 1$ to $A$ and $d = 1$ to $D$ do   ▷ learn the random variables
    for $d = 1$ to $randomVariable(a, :)$ do   ▷ for all the actions
        ▷ for all the random variable associate with action $a$
        if $d = r$ then   ▷ if $d$ is the reward random variable
            $tree = \text{CLASSIFYTREE}(X_t, y_{t+1}, catFlag)$
            $f_{a,r}(X_t, tree) = sample(tree(X_t))$
        else   ▷ reward
            $f_{a,d}(X_t) = sample(pdf(X_t(d)))$   ▷ random variables
        end if
    end for
end for

*Fig. 4C*

SYSTEM IDENTIFICATION FRAMEWORK

BACKGROUND

As consumer interaction with online resources (e.g., use of web resources, e-commerce, browsing activity, etc.) has grown digital marketing too has becoming increasingly more common. Generally, digital marketers seek to deliver offers for products, services, and content to consumers who will find the offers favorable and have a high probability of responding to the offers. Accordingly, one challenge faced by digital marketers is matching of offers to users so as to maximize the likelihood that users will accept the offers and accordingly optimize the return/reward to the digital marketers derived from the offers.

Traditionally, marketing schemes and corresponding offer selections are largely myopic in nature in that the traditional models primarily consider current conditions and short-term objectives. For instance, such schemes make determinations by considering just the next action/offer state in isolation from other past and/or future action/offer states. By neglecting to consider inter-state dependencies of actions and long-term objectives, traditional models may not adequately achieve maximization of long-term objectives, such as for revenue, satisfaction, offer acceptance, and so forth.

SUMMARY

Optimizing customer lifetime value (LTV) techniques are described that utilize a system identification framework. In one or more implementations, a simulator is configured to derive a prediction model based on data indicative of user interaction online with marketing offers. The prediction model may be produced by automatically classifying variables according to feature types and matching each feature type to a response function that defines how the variable responds to input actions. The classification of variables and/or corresponding response functions per the prediction model may consider dependencies between variables and dependencies between successive states. An evaluator may then be invoked to apply the prediction model to test a proposed marketing strategy offline. Application of the prediction model is designed to predict user response to simulated offers/actions and enable evaluation of marketing strategies with respect to one or more long-term objectives.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the following discussion.

FIG. 4A, FIG. 4B, FIG. 4C, and FIG. 4D each depict portions of an example algorithm employed for system identification in accordance with one or more implementations.

DETAILED DESCRIPTION

Overview

Figure 1:
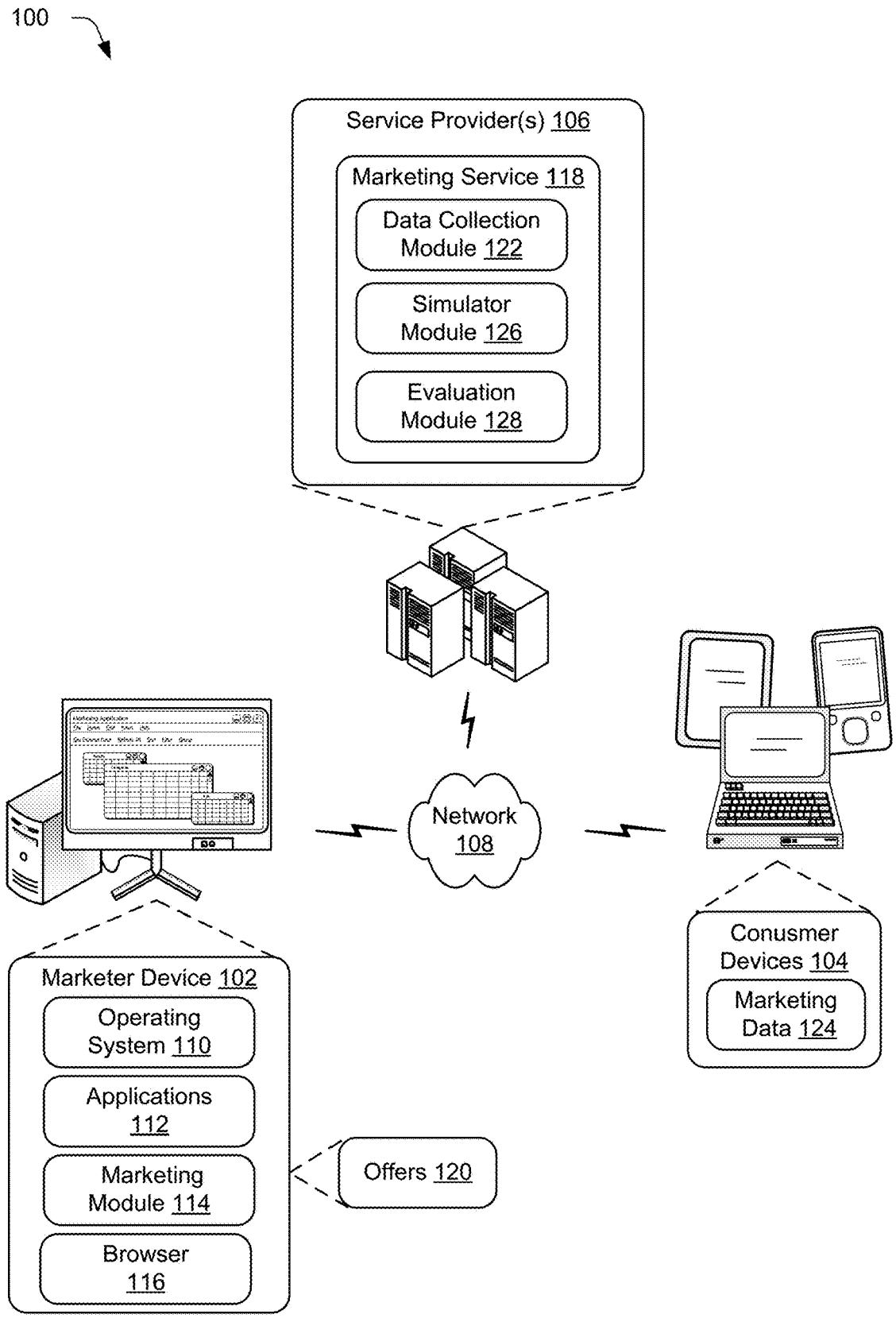
FIG. 1 is an illustration of an example operating environment that is operable to employ techniques for optimizing customer lifetime value (LTV).

Techniques are described herein in which offline simulators are developed and used to test marketing strategies in order to optimize lifetime value (LTV). For instance, marketing strategies may be evaluated in the context of ads, offers or other marketing actions that are directed to users when the users access web-based resources (e.g., online services, content, webpages, etc.). LTV may be expressed in terms of a measure of long-term objectives of a digital marketer such as revenue, customer satisfaction, or customer loyalty. These long-term objectives can be evaluated as the sum of an appropriate reward function.

The techniques discussed herein may rely at least in part upon Reinforcement Learning (RL) and/or Markov Decision Processes (MDPs) for sequential decision-making under uncertainty. In RL/MDP problems, an agent interacts with a dynamic, stochastic, and incompletely known environment, with the goal of finding a selection strategy, or policy, to maximize some measure of long-term performance. In one example, the agent is configured as an algorithm that simulates marketer actions, such as showing ads and offering promotions via webpages, and the environment is defined as a set of features, examples of which include but are not limited to customer demographics, characteristics of web content, and customer's behaviors such as recency (last time a resource was accessed), frequency (how often the resource has been accessed), and/or monetary behavior (spending habits/patterns). In this context, the reward may be defined as a function of whether or not the user accepts an offer and the value associated with the acceptance (e.g., purchase price). The goal of the evaluation is to compare marketing strategies and find a strategy that maximizes LTV.

In one or more implementations, a marketing service is configured to generate predicted user behaviors based upon marketing data collected from online interactions (e.g., real world data indicative of actual user interactions and features associated with the user interaction). The service may also operate to produce simulated offers/actions to represent behavior of a marketer (e.g., agent) in accordance with a marketing strategy that is being evaluated. For example, a simulator implemented by the marketing service may be configured to derive a prediction model based on collected marketing data that is indicative of user interaction online with marketing offers. The prediction model may be produced by automatically classifying variables according to feature types and matching each of the feature types to a response function that defines how the variables respond to input actions. The classification of variables and/or corresponding response functions per the prediction model may consider dependencies between variables and dependencies between successive states. An evaluator implemented by the marketing service may then be invoked to apply the prediction model to test a proposed marketing strategy offline. Application of the prediction model is designed to predict user response to simulated offers/actions and enable evaluation of one or more long-term objectives.

In the following discussion, an example environment is first described that may implement the techniques described herein. Example details regarding the techniques are then discussed in relation to some example scenarios, diagrams, and procedures. This discussion of example details includes separate sub-sections for example procedures, segmentation algorithms, and example user interfaces. Lastly, an example system and components of the system are discussed that may be employed to implement various techniques described herein.

Example Environment

FIG. 1 is an illustration of an environment 100 in an example implementation that is operable to employ techniques described herein. The illustrated environment 100 includes a marketer device 102, one or more consumer devices 104, and a service provider 106 that are communicatively coupled via a network 108. The marketer device 102, consumer devices 104, and service provider 106 may each be implemented by one or more computing devices and also may be representative of one or more entities.

A computing device may be configured in a variety of ways. For example, a computing device may be configured as a computer that is capable of communicating over the network 108, such as a desktop computer, a mobile station, an entertainment appliance, a set-top box communicatively coupled to a display device, a wireless phone, a game console, and so forth. Thus, the computing device may range from full resource devices with substantial memory and processor resources (e.g., personal computers, game consoles) to a low-resource device with limited memory and/or processing resources (e.g., traditional set-top boxes, handheld game consoles). Additionally, although a single computing device is shown in some instances, the computing device may be representative of a plurality of different devices, such as multiple servers of the service provider 106 utilized by a business to perform operations, and so on. Further examples of computing systems and devices suitable to implement techniques described herein are described below in relation to FIG. 7.

Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be configured to include multiple networks.

The marketer device 102 is further illustrated as including an operating system 110. The operating system 110 is configured to abstract underlying functionality of the underlying device to applications 112 that are executable on the client device 102. For example, the operating system 110 may abstract processing, memory, network, and/or display functionality such that the applications 112 may be written without knowing "how" this underlying functionality is implemented. The application 112, for instance, may provide data to the operating system 110 to be rendered and displayed by a display device as illustrated without understanding how this rendering will be performed. A variety of applications 112 typically associated with devices are contemplated including, but not limited to, a document reader, a multi-media player, image editing software, a productivity suite that integrates multiple office productivity modules, games, and so forth. As specific example of applications 112, the marketer device 102 is also illustrated as including a marketing module 114 and a browser 116.

The marketing module 114 may be configured in various ways to implement client side aspects of techniques for optimizing customer LTV described herein. As illustrated, the marketing module 114 may be provided as a standalone application that may enable digital marketers to manage marketing campaigns, audience data, market segments, and so forth. In general, this includes marketing data collection, analysis of data to ascertain market segments of consumers having selected traits, creation of offers for products, services, and/or content, and distribution of the offers. The marketing module 114 may facilitate interaction with a marketing service 118 provided by the service provider 106 over the network. Thus, the marketing module 114 may represent a thin client web-based application or a web-enabled desktop application through which a digital marketer may access a marketing account with the marketing service 118 and interact with corresponding data. In addition or alternatively, the techniques described herein may be implemented by way of the browser 116, which may be configured to access the marketing service 118 over the network 108.

As noted, the service provider 106 may provide a marketing service 118 as depicted in FIG. 1. The marketing service 118 is representative of an integrated digital marketing platform configured to provide a suite of digital marketing tools including but not limited to consumer data collection and analytics, social media management, digital advertising, audience targeting, and/or web experience management, to name a few examples. The marketing service 118 also enables generation of offers 120 that may be served to users via consumer devices 104. Offers 120 may include but are not limited to advertisements, links to other resources (services and content), digital coupons, informative (e.g., on-sale) offers, and promotional offers, to name a few examples. Various digital marketing tools may be made accessible via webpages or other user interfaces that may be accessed and rendered by a marketing device 102. The marketing service 118 may be implemented in the "cloud" as a service accessible over the network as illustrated, by one or more distributed components in a client-server environment, as a locally deployed enterprise platform, and/or in another suitable manner.

In accordance with techniques described above and below, the marketing service 118 may include or otherwise make use of a data collection module 122 that is configured to obtain and manipulate marketing data 124 from the consumer devices 104. In particular, the data collection module 122 represents functionality operable to collect, access, and/or make use of marketing data 124 that is indicative of online consumer interaction with offers. Generally, marketing data 124 may include user characteristics (e.g., age, sex, location, affiliations, etc.) and behaviors (e.g., browsing habits, favorites, purchase history, preferences, account activity, page views, offer views, etc.) from the various consumers. The data collection module 122 may collect and store marketing data 124 on behalf of digital marketers. For example, marketing data 124 may be collected based on visitors to a company website, in response to ads placed on third party webpages, through online surveys, as part of e-commerce transactions, based on account sign-ups, and so forth.

In addition to collection of marketing data, the marketing service 118 may be configured to utilize marketing data in various ways to inform digital marketers regarding user activities and facilitate creation of effective marketing strategies and campaigns. One such example of analysis involves techniques for optimizing customer LTV described in this document. For example, the marketing service 118 may include or otherwise make use of a simulator module 126 that represents functionality operable to analyze marketing data 124 to develop a prediction model that may be used to simulate user behavior. By way of example and not limitation, the simulator module 126 includes functionality to automatically derive feature types based on analysis of marketing data and classify variables of the model accordingly using the features types. Additionally, the simulator module 126 includes functionality to match each feature type to a corresponding response function that defines behavior of variables in response to simulated actions and/or offers. Examples and details regarding feature types and corresponding response functions are discussed in relation to FIGS. 2 and 3 later in this document.

The marketing service 118 may also include or otherwise make use of an evaluation module 128 that represents functionality operable to apply a prediction model developed via the simulator module 126 to test a proposed marketing strategy. The evaluation module 128 enables testing in an "offline" setting through simulation as opposed to having to test "online" using live, user interactions with real offers, which may adversely impact actual performance results. Additional details regarding application of a prediction model to determine predicted user response are also discussed in relation to the following figures.

Having considered an example environment, consider now a discussion of some example details of techniques for optimizing customer lifetime value in accordance with one or more implementations.

Optimizing Customer Lifetime Value Details

Example Scenario

Figure 2:
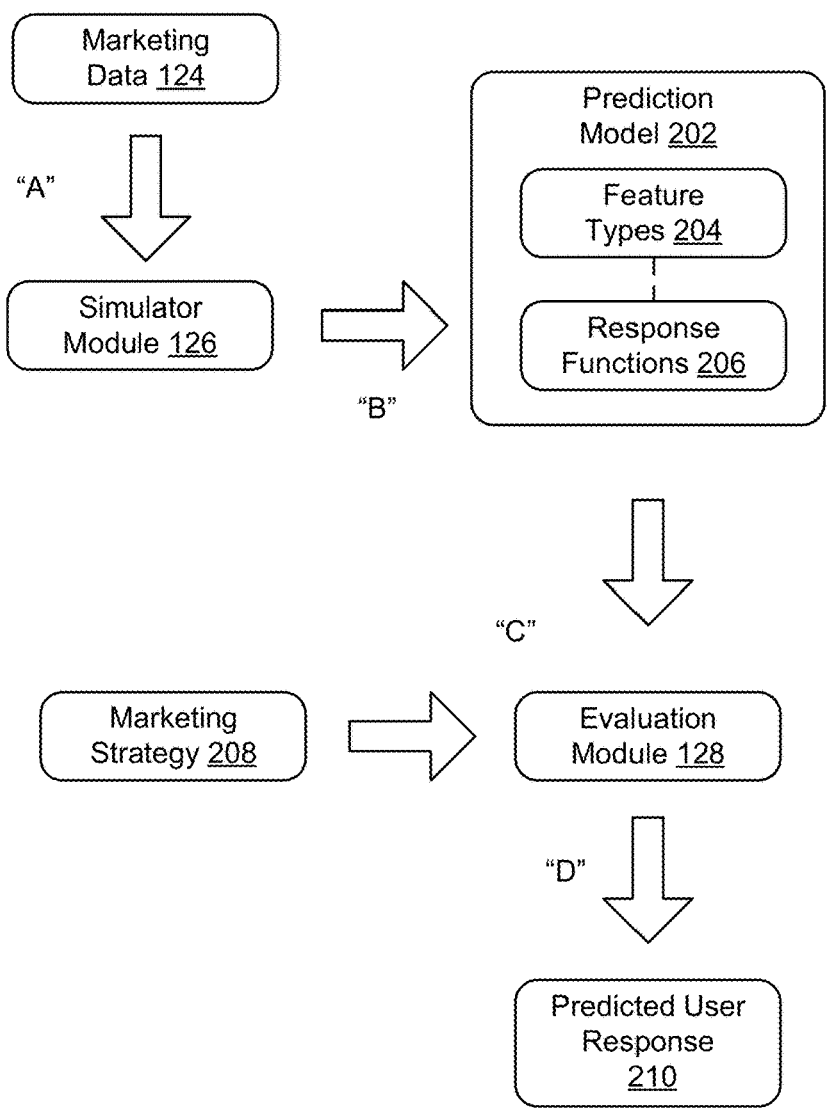
FIG. 2 is a diagram depicting an example scenario for optimizing customer lifetime value (LTV) in accordance with one or more implementations.

To further illustrate details of the example techniques, consider now FIG. 2 which depicts generally at 200 a diagram that represents an example scenario for optimizing customer lifetime value (LTV) in accordance with one or more implementations. In particular, FIG. 2 represents a sequence of example operations that may be performed to develop and use a prediction model 202 to evaluate marketing strategies. The example operations are indicated using letters "A" to "D". In the discussion, reference may be made to the example environment, devices, and components discussed in relation to FIG. 1.

At "A", marketing data 124 collected from consumer devices 104 is provided as input to a simulator module 126. In response, the simulator module 126 performs analysis at "B" to create a prediction model 202 based on the collected marketing data 124. For example, the simulator module 126 may parse the collected data to recognize different types of features and define corresponding feature types 204. In one approach, feature types for a particular system or environment may be selected from a set of available/supported feature types. Each feature type 204 indicates a particular classification of variables and also how values of the variables associated with the feature type vary or change in response to offers/actions. For instance, the simulator module 126 may operate to assign each feature type 204 a corresponding response function 206 that defines the way in which variables respond to input. By way of example and not limitation, feature types 204 and corresponding response functions 206 may be configured to support constant values, random variables, constant increments, dependent relationships between features, and so forth. A detailed discussion of example feature types 204 and corresponding response functions 206 is provided below in relation to FIG. 3.

At "C", the prediction model 202 is provided to the evaluation module 128 along with a marketing strategy 208 that is the subject of evaluation. In the context of the framework described herein, the marketing strategy 208 is designed to simulate behavior of a marketer to select offers, match offers to consumers, and serve the offers to the consumers. The marketing strategy 208 therefore produces a sequences of simulated offers/actions that are evaluated by the evaluation module 128 in accordance with the prediction model 202. More particularly, the prediction model 202 is configured to simulate user behavior by computing changes in variable values between states in response to the simulated offers/actions provided by the evaluation module 128 in accordance with the marketing strategy 208. In other words, given an initial state associated with variable values for a set of features and a simulated action, the evaluation module 128 operates to formulate a predicted user response 210 as represented at "D". The predicted user response 210 reflects updated variable values for the set of features (e.g., an updated or next state) computed in accordance with response functions 206 as specified by the prediction model 202.

Example Prediction Model

In accordance with the above framework, offline evaluations may occur to test marketing strategies in a variety of environments. Different environments may be associated with different sets of features that may be learned by the system. The features generally relate to user demographics, user's behaviors, and characteristics of web content and other resources accessed by users in connection with marketing offers. For example, in the context of user visits to company web sites or other access to web-based resources, a finite set of offers may be served to the users and the reward may be set to a designated value when a user clicks on the offer and set to zero otherwise. Examples of features that may be associated with access to web-based resources are shown in the following table:

TABLE 1

Example Features for User Access to Web-Based Resources

| | |
|---|---|
| Cum action | There is one variable for each offer to count number of times shown |
| Visit time recency | Time since last visit |
| Cum success | Sum of previous reward |
| Visit | The number of visits so far |
| Success recency | The last time there was positive reward |
| Longitude | Geographic location [Degrees] |
| Latitude | Geographic location [Degrees] |
| Day of week | Any of the 7 days |
| User hour | Any of the 24 hours |
| Local hour | Any of the 24 hours |
| User hour type | Any of weekday-free, weekday-busy, weekend |
| Operating system | Any of unknown, windows, mac, linux |
| Interests | There a finite number of interests for each marketer. Each interest is a variable |
| Demographics | There are many variables in this category such as age, income, home value, etc. |

Given a particular environment, the simulator module 126 may automatically examine features of the environment and derive corresponding feature types 204. The features may be learned, for example, by parsing of collected marketing data 124 to classify variables by feature type. A prediction model 202 may then be developed by specifying response functions 206 for each feature type that indicate how to compute, predict, or otherwise determine how variables associated with each feature type change in response to simulated actions.

Additionally, evaluation of a marketing strategy 208 using a prediction model may involve various reinforcement algorithms (RLs). In particular, proposed marketing strategies and therefore simulated marketer behaviors may be modeled using RLs as described herein. Generally, suitable reinforcement learning algorithms are able to handle high dimensional continuous variables, such as to make state transitions for a simulated user, determine predicted responses, and determine sequential actions/offers to simulate at each step accordingly. Some RLs utilize model-based methods in which various quantization techniques may be applied on collected marketing data to derive a state space that is reflected by a set of features. The transition probabilities and rewards may then be inferred from the data, and an optimal strategy and/or the value of the strategy may be found using standard Markov Decision Processes (MDPs). Just below, some non-limiting, illustrative examples of suitable RLs that may be employed in accordance the described techniques are enumerated. Details of these, as well as other suitable RLs, may be familiar to those of ordinary skill in the art.

One example is Kernel Based Reinforcement learning on Representative States (KBRL-RS). KBRL-RS operates to select representative states for the data using a cover tree. The algorithm then applies Kernel-Based RL on top of the representative states and in effect shows that this is equivalent to learning and solving an MDP on top of the representative states. A new state interpolates its value from the representative states according to the kernel. Another example is K-means-RL that operates to create representative states using a K-means algorithm. It then learns an MDP on top of those states and solves it. New observations are labeled and assigned the actions of their nearest states.

Fitted Q iteration (FQI) is another example RL algorithm that may be employed. The FQI method is a variation of Q iteration, where the exact Q function is computed by function approximation. The approximation is fitted by a non-parametric regressor, such as ensembles of regression trees. A new state uses the regressor for each action to estimate its Q value. A variation know as Fitted Q iteration-sarsa is largely the same as FQI but with sarsa style updates. The Fitted Q iteration-sarsa algorithm learns the value of a behavior policy that produces the simulated data. During execution, though, the algorithm choses the action with maximum Q value and in effect does one step improvement from the behavior policy. Lastly, an advanced model-based RL algorithm may be employed. The model-based RL algorithm is configured to automatically learn an MDP that includes a transition model T and a reward model R. R may be learned using multi-nominal logistic regression with L1 regularization. T may be learned using customized dynamic Bayesian networks.

A simulator module 126 may be configured to construct a prediction model 202 designed to selectively handle different kinds of features in a designated order: By so doing, the model may be configured to enable dependencies between different feature and successive states that facilitate making an assessment of LTV, in contrast to a myopic view of a single state/point in time in isolation. First instance, features that are considered easy to predict may be handled first. Example include static features such as geographic location and income, and/or other simple features such as a cumulative action counter. Next, features that act stochastically and have high impact on other features are identified and handled, such as time differences and reward functions. Such features may be simulated using random sampling from a distribution defined by the model. Lastly, remaining features that are not resolved by the preceding analysis may be predicted using regression trees on the previous observations and the sampled stochastic features.

Figure 3:
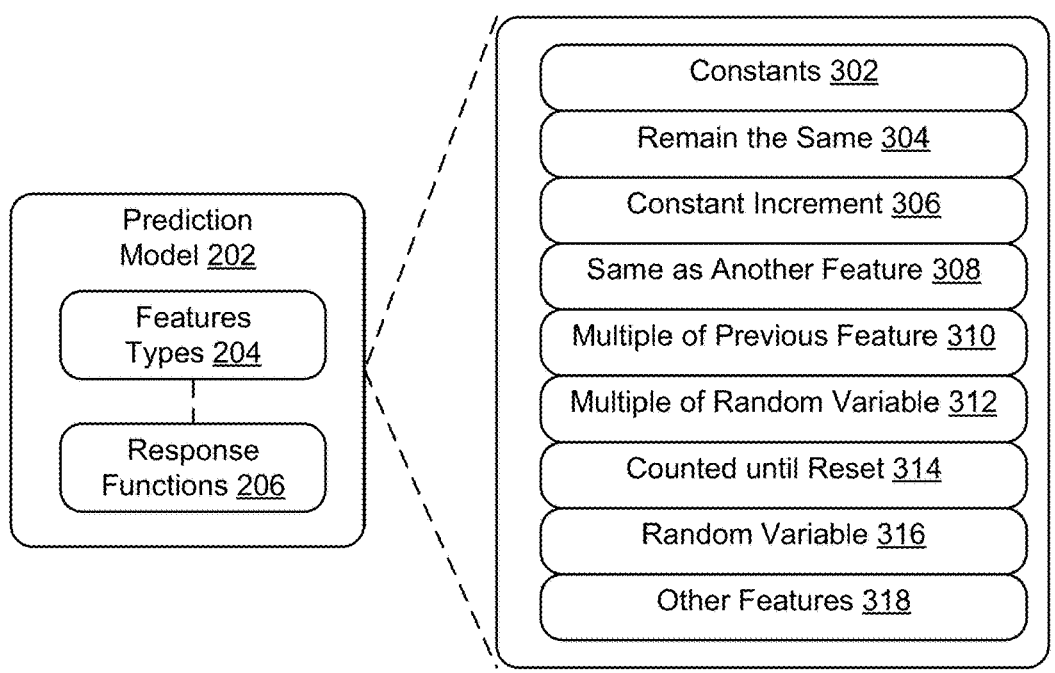
FIG. 3 is a diagram depicting details of an example prediction model in accordance with one or more implementations.

Consider now FIG. 3 which depicts generally at 300 a diagram depicting details of an example prediction model in accordance with one or more implementations. As noted previously and represented in FIG. 3, various categories of feature types 204 matched to corresponding response functions 206 are contemplated that may be implemented by a prediction model 202. In particular, the categories may include categories for features/variables values that are constant 302, remain the same 304 after being determined for an evaluation, vary as by a constant increment 306, are the same as another feature 308, vary as a multiple of a previous feature 310, vary as a multiple of a random variable 314, counted until a reset 314, random variables 316, and other features 318 not classified into the other categories. A prediction model 202 may be configured to use any suitable combination of one or more of these example categories, as well as other categories. The simulator module 126 is configured to construct an appropriate prediction model 202 for a given environment by analyzing the environment (e.g., as defined by collected marketing data) to recognize corresponding features and set-up categories for features/variables values accordingly. Details regarding the example categories enumerated above and further aspects of developing and using a prediction model 202 that may make use of such categorizations are now described.

In particular, given data in the form of state, action (e.g., offer), reward (e.g., value) and next state tuples $SARS_t=Xt$, at, rt, Xt+1, where $Xt=<x1, x2 \ldots xD>t$, the simulator module 126 is configured to build a predictor for each action and feature expressed as $X_t+(d)=f_{a,d}(X_t, r_t, a_t, rv)$ and a reward predictor for each action in the form $r_{t+1}=f_{a,r}(X_t, r_t, a_t)$, where rv are some predicted random variables at time t+1. The difficulty associated with making predictions may vary for different predictors. To manage the way in which different features are resolved and to optimize performance, features are classified by feature types and different kinds of features may be computed in a pre-set and/or defined order as noted previously. Just below, details of some example categorizations of feature types and corresponding response functions are discussed in turn. The categorization include:

Constant 302 features such as a cum action counter for some other action which is not taken again after the current action or an interest value that is determined and then does not change for subsequent actions. Such features may be matched to a response function having the form:

$$f_{a,d}(val)=val.$$

Remain the Same 304 features configured to remain the same value as the previous step. Examples include the cum action counters of other actions and demographics information. Such features may be matched to a response function having the form:

$$f_{a,d}(X_t)=X_t(d).$$

Constant Increment 306 features that for each action increase by a fixed increment. Examples include a cum action counter for the current action and a visit number. Such features may be matched to a response function having the form:

$$f_{a,d}(X_t,\text{val})=X_t(d)+\text{val}$$

Same as Another Feature 308 type features that have the same value as another feature 310. Examples include interest values that are scored by the same criteria. Such features may be matched to a response function having the form:

$$f_{a,d}(\text{same})=f_{a,same}(\ )$$

Multiple of a previous feature 310 type features that vary as a multiple of a previously determined feature. Such features may be matched to a response function having the form:

$$f_{a,d}(X_t,\text{mult},\text{featr})=X_t(d)+\text{mult}*X_t(\text{featr})$$

Multiple of a random variable 312 type features that vary as a multiple of a randomly determined value. An example is the cum success which increments by one if the reward is predicted to be one. Another example is timestamp, which can be estimated from a predicted visit time recency. Such features may be matched to a response function having the form:

$$f_{a,d}(X_t,\text{mult},rv)=X_t(d)+\text{mult}*rv$$

Counted until a reset 314 features that count events until a reset. An example is success recency, which increments until a reward is received and then resets. Such features may be matched to a response function having the form:

$$f_{a,d}(X_t,rv)=X_t(d)*(1-rv)+1$$

Random variable 316 features that take on different values in accordance with a probability distribution function (pdf). Random variables may be the hardest type of feature to simulate. Examples are visit time recency or an inter-arrival visitor time, which may have effectively random distributions and may have to be assessed empirically. Such features may be matched to a response function having the form:

$$f_{a,d}(X_t)=\text{sample}(\text{pdf}(X_t(d)))$$

Other features 318 is a category designed to capture remaining features that do not fit in one of the other types. These features may require direct classification or regression. An example is user interest. Such features may be matched to a response function having the form:

$$f_{a,d}(X_t,rv,\text{tree})=\text{tree}(X_t,rv)$$

Additionally, it should be noted that a reward predictor may also be treated as a random variable which is either one or zero. The probabilities of the values for the reward may be learned with a regression tree. A reward predictor function may have the form:

$$f_{a,r}(X_t,\text{tree})=\text{sample}(\text{tree}(X_t))$$

Thus, given a prediction model 202 developed in accordance with the foregoing details and example, the evaluation module 128 may evaluate an LTV strategy using the prediction model 202. In particular, for a plurality of successive steps/iterations at different times, the evaluation module 128 determines state transitions for variables in response to simulated actions/offers. For instance, given a current state $X_t$ and action $a_t$ the evaluation module 128 produces a new state vector $X_{t+1}$ and a reward $r_{t+1}$.

In one or more implementation, the evaluation module 128 is operable to produce a predicted user response that establishes a next state from an initial state by processing different types of features in an established order. For example, the evaluation module 128 may apply a prediction model 202 that is configured to determine outputs for random variables before other feature types are handled. Then, output values of features that depend upon the random variables or depend upon values known from the initial state (e.g., previously computed values) are predicted. Thereafter, outcomes of the features classified as having the same values as predicted output values are computed.

Example Algorithms

In accordance with the foregoing discussion, one illustrative example algorithm that reflects the general principals and concepts discussed herein is represented in relation to FIG. 4A, FIG. 4B, FIG. 4C, and FIG. 4D. In particular, each of FIG. 4A, FIG. 4B, FIG. 4C, and FIG. 4D depict portions of an example algorithm for system identification that may implement a prediction model 202 constructed via a simulator module 126 and that may be applied via an evaluation module 128 to test a marketing strategy 208.

In particular, FIG. 4A depicts generally at 400 a representation of a portion of an example algorithm for automatic system identification. The system identification refers to the process of automatically recognizing feature types 204 for the environment in order to classify variables and matching the feature types 204 to appropriate response functions 206 as discussed previously. As shown in the example of FIG. 4, the input to the algorithm includes actions (A), features (D), and state, action, reward, and next state $SARS_t=X_t$, $a_t$, $r_t$, $X_{t+1}$, where $X_t=\langle x1, x2 \ldots xD \rangle t$. The output is a predictor for each action and feature $X_{t+1}(d)=f_{a,d}(X_t, r_t, a_t, rv)$ and a reward predictor for each action $r_{t+1}=f_{a,r}(X_t, r_t, a_t)$, where rv are some predicted random variables at time t+1. The portion of the algorithm represented in FIG. 4A performs checks to classify features/variable by feature type 204.

Figure 4B:

FIG. 4B depicts generally at 402 a representation of another portion of the example algorithm for automatic system identification. In particular, based on the checks performed per FIG. 4A, the code represented in FIG. 4B matches the features/variables to appropriate response functions 206 (e.g., the predictors) to compute/predict the values based on simulated actions. The code represented in FIG. 4B may also detect and declare some features as random variables.

Figure 4D:

FIG. 4C depicts generally at 404 a representation of another portion of the example algorithm for automatic system identification. In particular, the code represented in FIG. 4C is configured to recognize features that have not already been classified according to a different feature types as the other feature types (e.g., "everything else"). Then, for these features, the algorithm learns and/or assigns appropriate prediction functions (e.g., classification trees, regression tree, probability distribution functions, etc.) to solve for the output values. The code represented in FIG. 4C may also learn and/or assign prediction functions for reward functions and random variables. FIG. 4D depicts generally at 406 a representation of a number of example utility functions that may be employed as part of system identification.

Example Procedures

The following discussion describes example procedures that may be implemented utilizing the previously described systems and devices. Aspects of each of the procedures may be implemented in hardware, firmware, or software, or a combination thereof. The procedures are shown as as a set of blocks that specify operations performed by one or more devices and are not necessarily limited to the orders shown for performing the operations by the respective blocks. In portions of the following discussion, reference may be made to the environment 100 of FIG. 1 and the examples of FIGS. 2-4. In at least some embodiments, the procedures may be performed by a suitably configured computing device(s), such one or more server devices associated with the service provider 106 that implement a marketing service 118 and/or a marketer device 102 of FIG. 1 that includes a suitable marketing module 114 or browser 116 to implement the described techniques.

Figure 5:
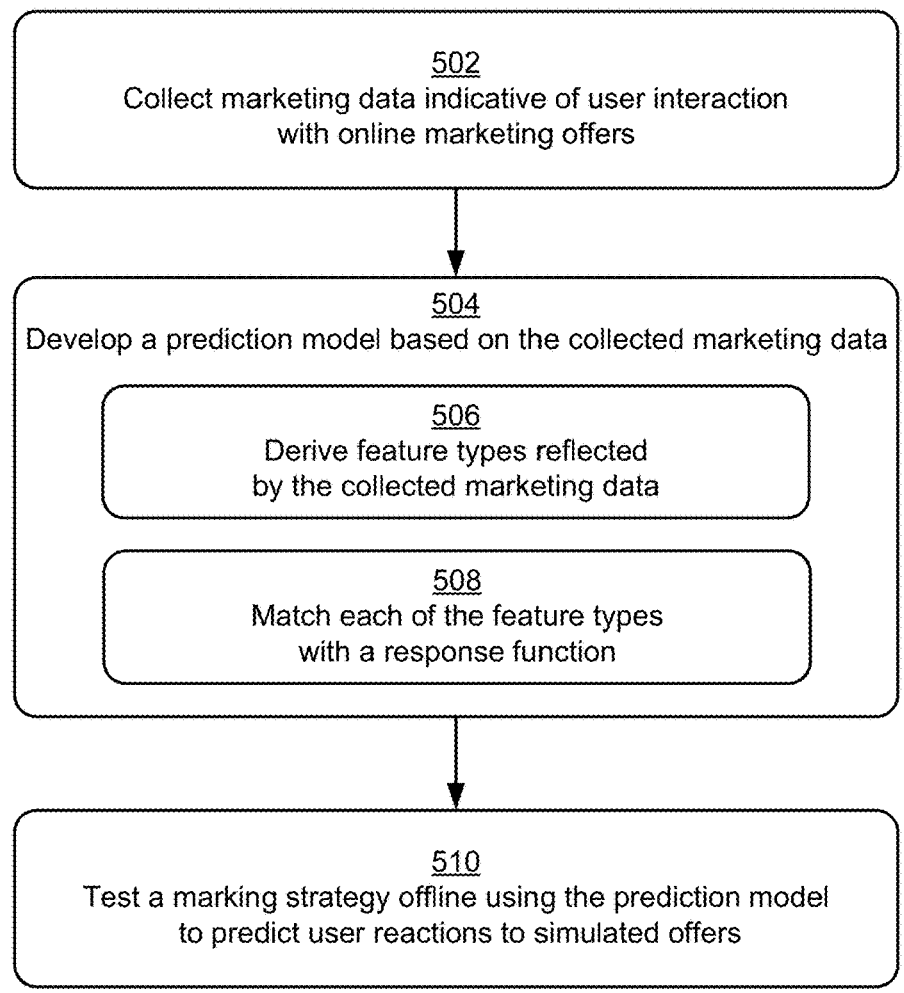
FIG. 5 is a flow diagram depicting an example procedure to derive and apply a prediction model for optimizing customer lifetime value (LTV) in accordance with one or more implementations.

FIG. 5 is a flow diagram depicting a procedure 500 to derive and apply a prediction model for optimizing customer lifetime value (LTV) in accordance with one or more implementations. Marketing data is collected that is indicative of user interaction with online marketing offers (block 502). For example, a marketing service 118 may collect various marketing data 124 via a collection module 122 or otherwise. As mentioned, the marketing data 124 describes characteristics of actual user interactions with offers associated with webpages and/or other resources accessed by the users. A prediction model is developed based on the collected marketing data (block 504). For example, a simulator module 126 may be invoked to create a prediction model 202 as discussed herein. This may involve deriving feature types reflected by the collected marketing data (block 506) and matching each of the feature types with a response function (block 506). To do so, the simulator module 126 may be configured to produce the prediction model 202 using a system identification algorithm, such as the example discussed in relation to FIGS. 4A-4D. More generally, feature types may be determined and matched to response function in any suitable manner. The prediction model 202 is created to simulate user behavior with respect to a particular environment, such as user responses to offers presented in connection with web-based resources that users access.

Then, a marking strategy is tested offline using the prediction model to predict user reactions to simulated offers (block 510). For instance, an evaluation module 128 may be invoked to apply the prediction model 202 to generate a predicted response 210. The evaluation is conducted to test a marketing strategy 208 that simulates marketer behavior. One or more marketing strategies may be represented by reinforcement learning functions (RL), examples of which were discussed previously, as well as using other techniques suitable to simulate a sequence of offers/actions. For instance, offers/actions may be randomly simulated or replayed from a historical record of actual marketer actions. A prediction model 202 may be applied in various ways to test different marketing strategies and compare the strategies one to another. Some further illustrative details and techniques for applying a prediction model are discussed in relation to the following example procedure.

Figure 6:
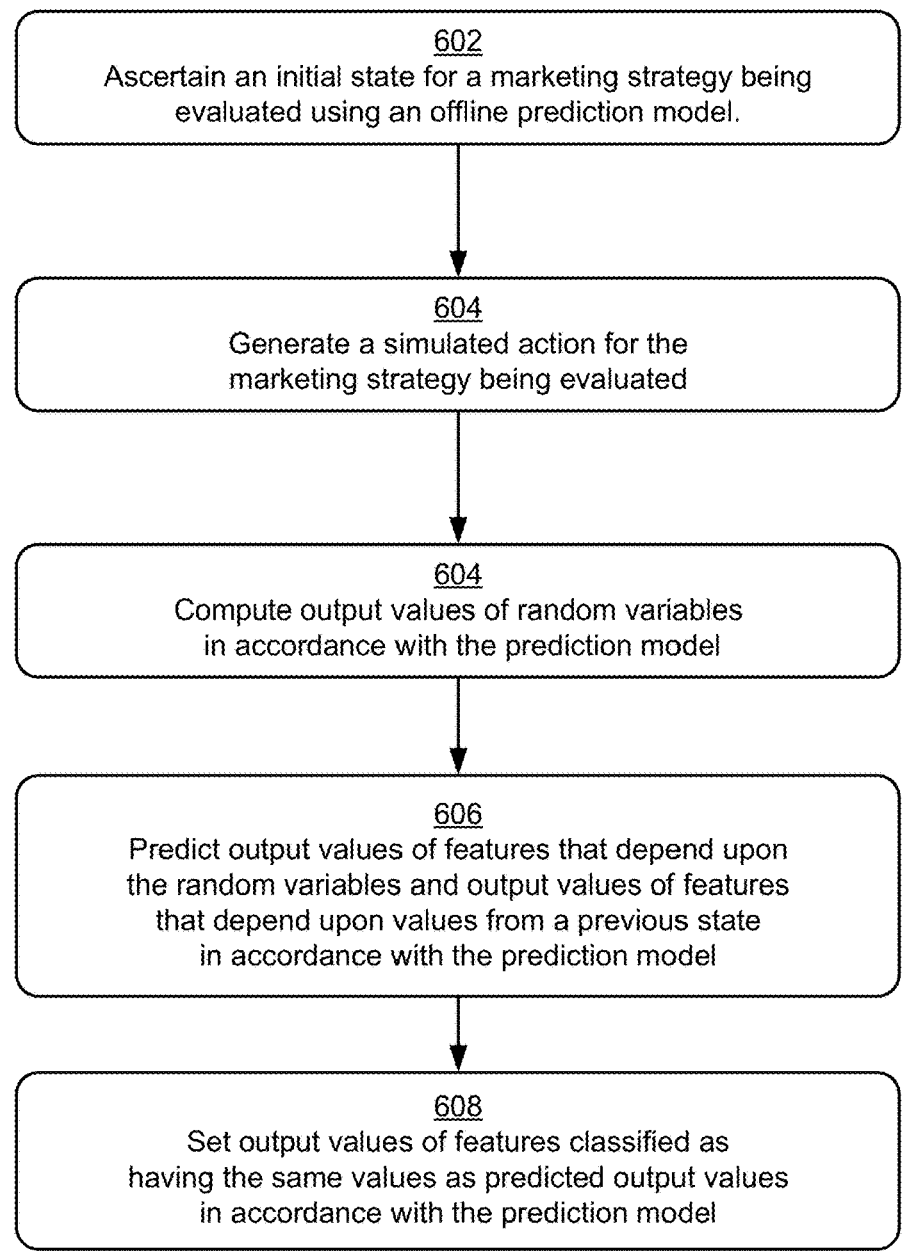
FIG. 6 is a flow diagram depicting a procedure that represent example details of using a prediction model to test a marketing strategy in accordance with one or more implementations.

In particular, FIG. 6 is a flow diagram depicting a procedure 600 that represent example details of using a prediction model to test a marketing strategy in accordance with one or more implementations. As noted, given a simulated offer (or other action), a prediction model 202 is configured to determine transitions of values for features between states. The analysis encoded via the prediction model reflects system identification to enumerate a set of feature types for an environment that may be used to classify variables. The classification of variables by feature types enables computation of output values for state transitions in an established order by feature type. This may reduce complexity of the computation and facilitate use of dependent relationships between values and states for lifetime value (LTV) assessment.

To do so, an initial state is ascertained for a marketing strategy being evaluated using an offline prediction model (block 602). For example, an evaluation module 128 may be invoked to compute or otherwise obtain values for the initial state. A simulated action is generated for the marketing strategy being evaluated (block 604). The action may be generated as specified by marketing strategy being evaluated. In operation, evaluations may involve a sequence of multiple simulated actions/offers. The system is further configured to determine predicted response to the simulated actions/offers in the manner described herein. This may be accomplished by computing variable values for different types of features in an established order by feature type. Various orders of computation for feature types are contemplated. In one particular example though, random variables may be determined before handling of other feature types (e.g., first). FIG. 6 represents but one illustrative example of a suitable computation order for feature types that involves computing random variables first. In particular, in accordance with the example of FIG. 6, the output values of random variables are computed in accordance with the prediction model (block 606). Output values of features that depend upon the random variables and output values of features that depend upon values from a previous state are predicted in accordance with the prediction model (block 608). Output values of are set for features classified as having the same values as predicted output values in accordance with the prediction model (block 610).

Example System and Devices

Figure 7:
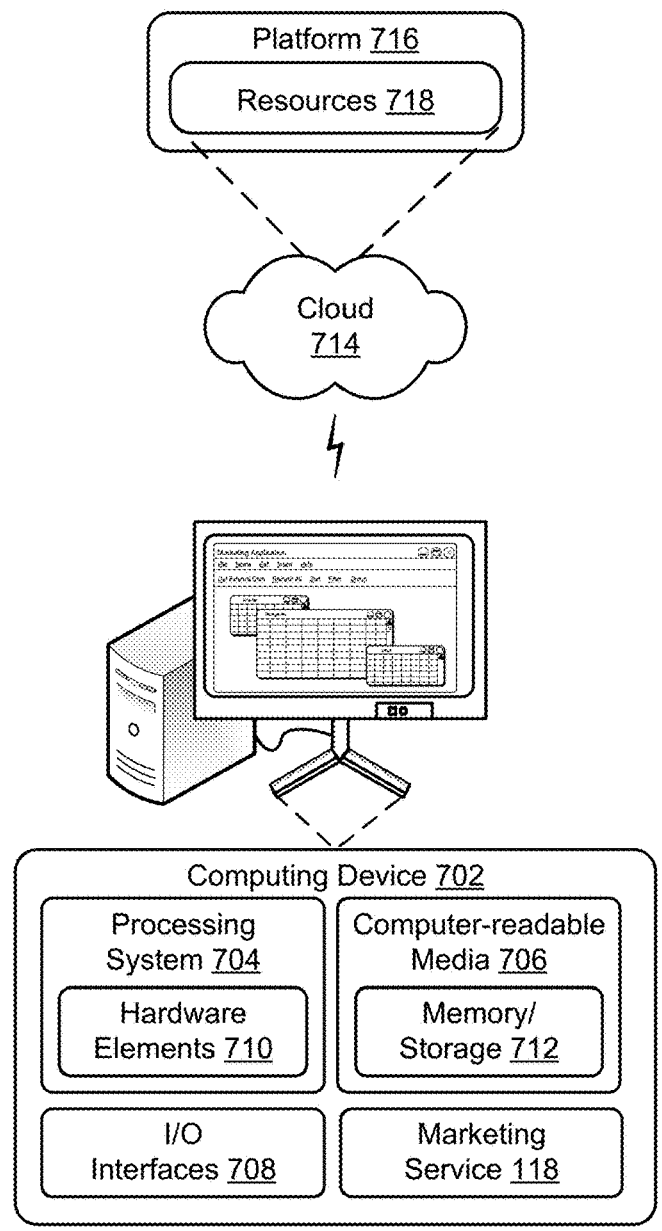
FIG. 7 illustrates an example system, devices, and components that can be employed to implement aspects of the techniques described herein.

FIG. 7 illustrates an example system generally at 700 that includes an example computing device 702 that is representative of one or more computing systems and/or devices that may implement the various techniques described herein. This is illustrated through inclusion of the marketing service 118, which may be configured to provide a suite of digital marketing tools to users of the service. Alternatively, the computing device may represent a client device that includes a marketing module 114 or browser 116 to implement aspects of the described techniques. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable storage of information in contrast to mere signal transmission, carrier waves, or signals per se. Thus, computer-readable storage media does not include signal bearing media or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computing device comprising:
   a processing system;
   one or more computer-readable media storing instructions that, when executed by the processing system, implement:
      a data collector configured to collect marketing data indicative of user interaction with online marketing offers provided by digital marketers in connection with access to resources over a computer network;
      a simulator configured to perform operations including:
         analyzing the collected marketing data to learn a set of features, classifying the features by feature types, and assigning response functions to the feature types that define how variables classified within each feature type respond to simulated online marketing offers; and
         deriving a prediction model based on the assigned response functions that models multiple marketing strategies according to a Q iteration reinforcement algorithm;
      an evaluator configured to test the multiple marketing strategies offline using the prediction model, including, for each of the multiple marketing strategies:
         ascertaining a respective value for each of the variables at a first time-state;
         generating a first simulated online marketing offer at the first time-state according to the respective marketing strategy;
         predicting a user reaction to the first simulated online marketing offer at the first time-state;
         responsive to predicting the user reaction to the first simulated online marketing offer, updating the respective value for each of the variables at a second time-state based on the response functions by:
            updating a value of at least one of the variables to a random value; and
            updating a value of at least one other of the variables based on the respective value at the first time-state and the random value;
         generating a second simulated online marketing offer at the second time-state according to the respective marketing strategy; and
         predicting a user reaction to the second simulated offer at the second time-state;
      the evaluator further configured to perform operations including:
         comparing the multiple marketing strategies one to another using the Q iteration reinforcement algorithm, fitted by non-parametric regression trees corresponding to a long term offer acceptance value for each of the marketing strategies to the user reactions at the first and second time-states;
         selecting an optimal marketing strategy from among the multiple marketing strategies that maximized a Q value of the Q iteration reinforcement algorithm corresponding to the long term offer acceptance value; and
         outputting the optimal marketing strategy.

2. The computing device of claim 1, wherein the data collector, simulator, and evaluator are implemented as components of an integrated digital marketing platform configured to provide a suite of digital marketing tools.

3. The computing device of claim 1, wherein the feature types include feature types configured to support constant values, random variables, and dependent relationships between the features.

4. The computing device of claim 1, wherein the feature types are identified automatically based on parsing of the collected marketing data.

5. The computing device of claim 1, wherein the evaluator further computes transitions for additional time states by, for each time state of the additional time states, predicting a response to a previous simulated action, updating the values of the variables based on the predicted responses, and using the updated values of the variables as part of predicting a response for a next simulated action of a time-based sequence.

6. The computing device of claim 5, wherein the simulated actions include simulated offers and predicting responses includes predicting whether the simulated offers are accepted or rejected.

7. The computing device of claim 1, wherein selecting the optimal marketing strategy includes scoring the marketing strategies according to the offer acceptance long term value and identifying a strategy associated with a maximum of the offer acceptance long term value as the optimal marketing strategy.

8. The computing device of claim 1, wherein comparing the marketing strategies by the evaluator includes computing a sum of a reward function configured to measure one or more long term objectives to assess the offer acceptance long term value for each of the marketing strategies.

9. A method implemented by a computing device comprising:
   collecting marketing data indicative of user interaction with online marketing offers provided by digital marketers in connection with access to resources over a computer network;
   analyzing, by a simulator, the collected marketing data to learn a set of features, classifying the features by feature types, and assigning response functions to the feature types that define how variables classified within each feature type respond to simulated online marketing offers;
   deriving, by the simulator, a prediction model based on the assigned response functions that models multiple marketing strategies according to a Q iteration reinforcement algorithm;

testing, by an evaluator, the multiple marketing strategies offline using the prediction model, including, for each of the multiple marketing strategies:
  ascertaining a respective value for each of the variables at a first time-state;
  generating a first simulated online marketing offer at the first time-state according to the respective marketing strategy;
  predicting a user reaction to the first simulated online marketing offer at the first time-state;
  responsive to predicting the user reaction to the first simulated online marketing offer, updating the respective value for each of the variables at a second time-state based on the response functions by:
    updating a value of at least one of the variables to a random value; and
    updating a value of at least one other of the variables based on the respective value at the first time-state and the random value;
  generating a second simulated online marketing offer at the second time-state according to the respective marketing strategy; and
  predicting a user reaction to the second simulated offer at the second time-state;
comparing, by the evaluator; the multiple marketing strategies one to another using the Q iteration reinforcement algorithm, fitted by non-parametric regression trees corresponding to a long term offer acceptance value for each of the marketing strategies to the user reactions at the first and second time-states; and
selecting an optimal marketing strategy from among the multiple marketing strategies that maximized a Q value of the Q iteration reinforcement algorithm corresponding to the long term offer acceptance value.

10. A method as described in claim 9, wherein the simulator and the evaluator are implemented as components of an integrated digital marketing platform configured to provide a suite of digital marketing tools.

11. A method as described in claim 9, wherein the feature types include feature types configured to support constant values, random variables, and dependent relationships between the features.

12. A method as described in claim 9, wherein the feature types are identified automatically based on parsing of the collected marketing data.

13. A method as described in claim 9, further comprising computing transitions for additional time states by, for each time state of the additional time states, predicting a response to a previous simulated action, updating the values of the variables based on the predicted responses, and using the updated values of the variables as part of predicting a response for a next simulated action of a time-based sequence.

14. One or more computer-readable storage media comprising instructions that, when executed by a computing device, implement a marketing service configured to perform operations comprising:
  collecting marketing data indicative of user interaction with online marketing offers provided by digital marketers in connection with access to resources over a computer network;
  analyzing the collected marketing data to learn a set of features, classifying the features by feature types, and assigning response functions to the feature types that define how variables classified within each feature type respond to simulated online marketing offers;
  deriving a prediction model based on the response functions that models multiple marketing strategies according to a Q iteration reinforcement algorithm;
  testing the multiple marketing strategies offline using the prediction model, including, for each of the multiple marketing strategies:
    ascertaining a respective value for each of the variables at a first time-state;
    generating a first simulated online marketing offer at the first time-state according to the respective marketing strategy;
    predicting a user reaction to the first simulated online marketing offer at the first time-state;
    responsive to predicting the user reaction to the first simulated online marketing offer, updating the respective value for each of the variables at a second time-state based on the response functions by:
      updating a value of at least one of the variables to a random value; and
      updating a value of at least one other of the variables based on the respective value at the first time-state and the random value;
    generating a second simulated online marketing offer at the second time-state according to the respective marketing strategy; and
    predicting a user reaction to the second simulated offer at the second time-state;
  comparing the multiple marketing strategies one to another using the Q iteration reinforcement algorithm, fitted by non-parametric regression trees corresponding to a long term offer acceptance value for each of the marketing strategies to the user reactions at the first and second time-states; and
  selecting an optimal marketing strategy from among the multiple marketing strategies that maximized a Q value of the Q iteration reinforcement algorithm corresponding to the long term offer acceptance value.

15. The one or more computer-readable storage media in claim 14, the operations further comprising computing transitions for additional time states by, for each time state of the additional time states, predicting a response to a previous simulated action, updating the values of the variables based on the predicted responses, and using the updated values of the variables as part of predicting a response for a next simulated action of a time-based sequence.

16. A method as described in claim 13, wherein the simulated actions include simulated offers and predicting responses includes predicting whether the simulated offers are accepted or rejected.

17. A method as described in claim 9, wherein selecting the optimal marketing strategy includes scoring the marketing strategies according to the offer acceptance long term value and identifying a strategy associated with a maximum of the offer acceptance long term value as the optimal marketing strategy.

18. A method as described in claim 9, wherein comparing the marketing strategies by the evaluator includes computing a sum of a reward function configured to measure one or more long term objectives to assess the offer acceptance long term value for each of the marketing strategies.

19. The one or more computer-readable storage media in claim 15, wherein the simulated actions include simulated offers and predicting responses includes predicting whether the simulated offers are accepted or rejected.

20. The one or more computer-readable storage media in claim 14, wherein selecting the optimal marketing strategy includes scoring the marketing strategies according to the offer acceptance long term value and identifying a strategy associated with a maximum of the offer acceptance long term value as the optimal marketing strategy.

\* \* \* \* \*